(12) United States Patent
Lee

(10) Patent No.: US 12,061,614 B2
(45) Date of Patent: Aug. 13, 2024

(54) RECOMMENDATION ALGORITHM-BASED PROBLEM ACTION SUGGESTION SYSTEM AND METHOD THEREOF

(71) Applicants: HYUNDAI MOTOR COMPANY, Seoul (KR); KIA CORPORATION, Seoul (KR)

(72) Inventor: Yoon Soo Lee, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 155 days.

(21) Appl. No.: 17/979,277

(22) Filed: Nov. 2, 2022

(65) Prior Publication Data
US 2023/0161780 A1    May 25, 2023

(30) Foreign Application Priority Data

Nov. 19, 2021  (KR) .................. 10-2021-0160332

(51) Int. Cl.
| | | |
|---|---|---|
| *G06F 16/2457* | (2019.01) | |
| *G06F 16/248* | (2019.01) | |
| *G06F 16/25* | (2019.01) | |
| *G06N 20/00* | (2019.01) | |
| *G06Q 10/20* | (2023.01) | |

(52) U.S. Cl.
CPC ...... *G06F 16/24578* (2019.01); *G06F 16/248* (2019.01); *G06F 16/254* (2019.01); *G06N 20/00* (2019.01); *G06Q 10/20* (2013.01)

(58) Field of Classification Search
CPC ............. G06F 16/24578; G06F 16/248; G06F 16/254; G06F 40/211; G06F 40/284; G06F 16/3329; G06F 16/3343; G06F 16/3347; G06F 16/335; G06F 11/008; G06F 16/901; G06F 16/90332; G06F 16/9038; G06N 20/00; G06Q 10/20; G06Q 10/06311; G06Q 10/0639; G06Q 50/04; G06Q 50/10; G10L 15/26

See application file for complete search history.

(56) References Cited

U.S. PATENT DOCUMENTS

| | | | | |
|---|---|---|---|---|
| 10,088,984 | B2 * | 10/2018 | Plummer | G06N 20/00 |
| 2015/0066782 | A1 * | 3/2015 | Vainberg | G06Q 10/20 |
| | | | | 705/305 |
| 2020/0097921 | A1 * | 3/2020 | Ghosh | G06N 3/08 |
| 2020/0258057 | A1 * | 8/2020 | Farahat | G06Q 10/20 |

(Continued)

*Primary Examiner* — Jorge A Casanova
(74) *Attorney, Agent, or Firm* — MCDONNELL BOEHNEN HULBERT & BERGHOFF LLP

(57) ABSTRACT

A recommendation algorithm-based problem action suggestion system includes a query input unit configured to extract text data for each item in user's query information received from a user terminal in abnormality of a device of production equipment or a product, a database unit configured to manage a past action history of workers with respect to abnormality occurrence of the device into a database (DB) of problem action data, and a controller configured to perform a pre-processing work for converting the text data into numerical data that may be processed by the recommendation algorithm, to obtain similarity between the numerical data and the problem action data of the database unit and to suggest action methods to the user terminal in an order of higher probability of solving the problem.

17 Claims, 13 Drawing Sheets

(56) References Cited

U.S. PATENT DOCUMENTS

| | | | |
|---|---|---|---|
| 2021/0034996 A1* | 2/2021 | Imai | G06N 20/00 |
| 2021/0260482 A1* | 8/2021 | Nakahashi | A63F 13/5375 |
| 2021/0398363 A1* | 12/2021 | Olalere | G06Q 10/20 |
| 2022/0036370 A1* | 2/2022 | Rodman | G06Q 30/016 |

* cited by examiner

FIG. 2

| Category | Details |
|---|---|
| Device information | Model name |
| | Specification |
| | Production date |
| | Use start date |
| | Use days |
| | S/W ver |
| Usage environment | Production volume |
| | Cycle time |
| | Process |
| | Add-on function |
| Measurement information | Temperature |
| | Voltage |
| | Current |
| | Resistance |
| | Vibration |
| | Concentration |
| Abnormality information | Abnormality query content |
| | Error code |
| Action content | Start time |
| | End time |
| | Cause |
| | Solution plan |
| | Action comments |

FIG. 6

■ Manual/error code: E100

| No. | Action method | Occurrence frequency /similarity | Recommendation result |
|---|---|---|---|
| 1 | Inspection of component part A | 10% | 3 |
| 2 | Inspection of component part B | 2% | 5 |
| 3 | Inspection of component part C | 34% | 2 |
| 4 | Inspection of component part D | 50% | 1 |
| 5 | Inspection of component part E | 9% | 4 |
| 6 | Inspection of component part F | 1% | 6 |

■ Suggestion

In the case of E100 of model A, there were frequent problems with part D. Please test drive after replacing the motor and calibration.

Defect was reported to the encoder unit in the model produced in October 2001. Check the production date and make a claim if applicable.

■ User action result input

| Manual Root Cause | Input action content (Text) |
|---|---|
| No. 4 (inspection of component part D) | After disassembling, component part D is confirmed to have been damaged and replaced | or

| No. 3 (inspection of component part C) | After disassembling, component part C is confirmed to have been damaged and replaced |

FIG. 8

| Device information | Model name | HS165 |
|---|---|---|
| | Controller specification | Hi5 |
| | Tool | Welding gun |
| | Installation date | 2010.7 |
| | Production date | 2009.8 |
| | SW | V1.2 |
| Usage environment | Production volume | 00UPH |
| | Cycle time | 72 seconds |
| | Process | Vehicle body build |
| | Add-on function | Welding |
| State information | Current | 10A |
| | Temperature | 60° |
| | Resistance | - |
| | Torque | 25 |
| | Load factor | 70% |
| | Other 1 | |
| Abnormality information | Error code | E100(or N/A) |
| | Abnormality | Same error occurs after 1 hour of operation when restarted after clearing the error |
| Action suggestion search |||

<Input of user's query information>

FIG. 9

| Failure action suggestion | |
|---|---|
| Additional information | In this case, a similar case exists due to memory leakage of the controller, and upgrade is suggested after checking the firmware of S/W(V1.3) (V1.3) |
| Expected action period | 30 minutes |

| Result of failure action | | | |
|---|---|---|---|
| Started | 21.7/30 13:00 | End | 21.7/30 14:00 |
| Cause | Firmware | Solution plan | Firmware update |
| Comments | - | | |
| Manager | Identification of manager (name, department, and factory) | | |
| Transmission of action result | | | |

<When error code does not exist>

FIG. 10

| Result of failure action | | | |
|---|---|---|---|
| No. | Manual | Occurrence frequency | Recommended sequence |
| 1 | Inspection of component part A | 10% | 2 |
| 2 | Inspection of component part B | 5% | 4 |
| 3 | Inspection of component part C | 3% | 6 |
| 4 | Inspection of component part D | 50% | 1 |
| 5 | Inspection of component part E | 5% | 5 |
| 6 | Inspection of component part F | 7% | 3 |
| Expected action period | | | 30 minutes |
| Additional information | Defective lot of component part D in the model produced in August 2009: suggestion to check production date | | |
| Result of failure action | | | |
| Started | 21.7/30 13:00 | End | 21.7/30 14:00 |
| Cause | Deterioration of component part | Solution plan | Replacement component part B |
| Comments | Adjustment for inspection period for component part B is required (from currently 6 months to 3 months suggested) | | |
| Manager | Identification of manager (name, department, and factory) | | |
| Transmission of action result | | | |

<When error code exists>

FIG. 11

| Vehicle information | Model name | Vehicle A |
| --- | --- | --- |
| | Specification | Premium |
| | Engine | Gamma |
| | Registration date | 2010.7 |
| | Production date | 2009.8 |
| | Other 1 | |
| Measurement | Battery | 10A |
| | Intake | 00 |
| | Exhaust | 00 |
| | Tire pressure | 25 |
| | Other 1 | |
| | Other 2 | |
| Abnormality information | DTC code | E100(or N/A) |
| | Phenomenon | Intermittent poor start |
| Search action suggestion | | |

<Input of user's query information>

FIG. 12

| Result of failure action |||
|---|---|---|
| Additional information | In the case of vehicle model A, many cases of intermittent poor start due to carbon accumulation on the intake side after 10 years. Inspection of intake system parts required ||
| Expected action period || 30 minutes |
| Result of failure action |||

| Result of failure action ||||
|---|---|---|---|
| Started | 21.7/30 13:00 | End | 21.7/30 14:00 |
| Cause | Carbon accumulation | Solution plan | Cleaning |
| Comments | Replacement required upon future occurrence |||
| Manager | Identification of manager (name, department, and factory) |||
| Transmission of action result ||||

⟨When error code does not exist⟩

FIG. 13

| No. | Failure action suggestion | | |
|---|---|---|---|
| | Manual | Occurrence frequency | Recommended sequence |
| 1 | Inspection of component part A | 10% | 2 |
| 2 | Inspection of component part B | 5% | 4 |
| 3 | Inspection of component part C | 3% | 6 |
| 4 | Inspection of component part D | 50% | 1 |
| 5 | Inspection of component part E | 5% | 5 |
| 6 | Inspection of component part F | 7% | 3 |
| Expected action period | | | 30 minutes |
| Additional information | | | |

| Result of failure action | | | |
|---|---|---|---|
| Started | 21.7/30 13:00 | End | 21.7/30 14:00 |
| Cause | Deterioration of component part | Solution plan | Replacement of component part B |
| Comments | - | | |
| Manager | Identification of manager (name, department, and factory) | | |
| Transmission of action result | | | |

<When error code exists>

RECOMMENDATION ALGORITHM-BASED PROBLEM ACTION SUGGESTION SYSTEM AND METHOD THEREOF

CROSS REFERENCE TO RELATED APPLICATIONS

This application claims priority to and the benefit of Korean Patent Application No. 10-2021-0160332 filed in the Korean Intellectual Property Office on Nov. 19, 2021, the entire contents of which are incorporated herein by reference.

BACKGROUND

(a) Field

The present disclosure relates to a recommendation algorithm-based problem action suggestion system and a method thereof. More particularly, the present disclosure relates to a recommendation algorithm-based problem action suggestion system and a method thereof that may help prompt action when a problem occurs in an industrial field.

(b) Description of the Related Art

In general, when problems such as malfunctions occur in production equipment or products in production factories or service centers, each worker's know-how or manuals are used to take measures. However, there are individual differences in the time and quality of action to deal with the occurred problems.

For example, a vehicle factory operates various production equipment for each automated inline process, and a problem in the production equipment adversely affects the yield, so prompt action is required.

However, it is difficult to determine an appropriate procedure and sequence for the action because it is necessary to sequentially check the related processes and other various equipment and parts when taking an action on one case where a failure occurs in one production equipment.

In addition, it takes a long time for new workers to accumulate the technical know-how, and there is a large deviation in the action time and quality depending on the level required by the action manual.

The above information disclosed in this Background section is only for enhancement of understanding of the background of the disclosure, and therefore it may contain information that does not form the prior art that is already known in this country to a person of ordinary skill in the art.

SUMMARY

The present disclosure provides a recommendation algorithm-based problem action suggestion system and a method thereof capable of decreasing an action period and providing uniformly improved quality by promptly suggesting a problem action method through recommendation algorithm when a problem occurs in a production equipment or a product.

An exemplary recommendation algorithm-based problem action suggestion system includes a query input unit configured to extract text data for each item in user's query information received from a user terminal in abnormality of a device of production equipment or a product, a database unit configured to manage a past action history of workers with respect to abnormality occurrence of the device into a database (DB) of problem action data, and a controller configured to perform a pre-processing work for converting the text data into numerical data that may be processed by the recommendation algorithm, to obtain similarity between the numerical data and the problem action data of the database unit and to suggest action methods to the user terminal in an order of higher probability of solving the problem.

The query input unit may include a communication module configured to receive the query information with respect to problem situation of the device in the form of at least one of text and speech through a graphical user interface (GUI) of the user terminal, a speech recognition module configured to convert the speech into the text data through a speech recognition algorithm, and a query input module configured to extract user information and the text data for each item from the query information, to collect the text data converted through the speech recognition module, and input the collected data to the controller.

The problem action data may include at least one of device information, usage environment, measurement information, abnormality information, and action content.

The database unit may include a manual DB configured to store action manual with respect to error codes for previously known various problem situations for each type and specification of the device, a problem action history DB configured to store a problem action history of cases in which workers of the production factory or service center have taken actions for various problem situations occurring in the device of various equipment or products, and a data management module configured to receive the problem action history from the user terminal and to continuously update the problem action history DB with the received problem action history.

The data management module may be configured to, when reliability of an action method is verified because an action success rate with respect to a certain problem situation managed in the problem action history DB meets a predetermined standard, assign a new error code to the certain problem situation and manage the error code for the certain problem situation and the verified action method in the manual DB.

The user's query information may include device information, a degree of deterioration, a state measurement value, and an abnormality query content.

The controller may include a pre-processing module configured to convert the text data into the numerical data that may be processed in the recommendation algorithm by performing a natural language processing on the text data to remove a stopword and by performing a pre-processing of tokenizing and word embedding on the text data, an algorithm learning module configured to create and manage a word embedding model and a corresponding database in advance, for the pre-processing work on an abnormality query content of the user in the text data, and an algorithm control module configured to extract data meeting a predetermined similarity condition from a problem action history DB of the database unit by using the numerical data, and to provide an action method of a highest similarity among the extracted data as recommendation through a graphical user interface (GUI) of the user terminal.

The pre-processing module may be configured to process numerical values for respective items of a degree of deterioration and a state measurement value inputted as the query information into normalized numerical data through categorizing and scaler-processing.

The algorithm control module may be configured to calculate similarity between two vectors of the numerical data and problem action history DB data and to recommend action methods in an order of higher similarity.

The algorithm control module may be configured to calculate the similarity by using at least one of a Euclidean distance measurement method of measuring a linear distance between the two vectors, a cosine similarity measurement method of measuring similarity through an angle between the two vectors, and Manhattan distance measurement method that uses a sum of absolute values of Cartesian coordinate differences of the two vectors.

The pre-processing module may be configured to preferentially check whether an error code exists in the text data, and to inquire a related action manual in a manual DB of the database unit.

The algorithm control module may be configured to display a recommendation result in an order of higher occurrence frequency among at least one the action method included in the action manual, and to suggest an action method of a highest occurrence frequency to the user terminal with an emphasis.

The algorithm control module may be configured to compare at least one the action method included in the action manual and the action method extracted from the problem action history DB, to display a recommendation result in an order of higher similarity, and to suggest an action method of a highest similarity to the user terminal with an emphasis.

An exemplary recommendation algorithm-based problem action suggestion method includes extracting text data for each item in user's query information received from a user terminal in abnormality of a device of production equipment or a product, determining whether an error code exists in the text data, performing, when the error code does not exist, a pre-processing work for converting the text data into numerical data that may be processed by the recommendation algorithm, and providing a recommendation of action methods in an order of higher probability of solving the problem to the user terminal, by obtaining similarity between the numerical data and problem action data stored in a problem action history DB by performing the recommendation algorithm.

The performing the pre-processing work may include processing numerical values for respective items in the text data into normalized numerical data through categorizing and scaler-processing, and converting a sentence contained in the user's abnormality query content in the text data into the numerical data through natural language processing and word embedding processing through a tokenizer.

The providing the recommendation may include calculating similarity between two vectors of the numerical data and data stored in the problem action history DB, extracting action methods meeting a predetermined similarity criteria condition, and providing a suggestion of a failure action method of a highest similarity among the extracted action methods through the user terminal.

An exemplary recommendation algorithm-based problem action suggestion method may further include, after the determining whether an error code exists in the text data, inquiring a related action manual in a manual DB of the database unit depending on a user's option selection, when the error code exists in the text data, and displaying a recommendation result in an order of higher occurrence frequency among at least one the action method included in the action manual through a graphical user interface (GUI) of the user terminal, and suggesting an action method of a highest occurrence frequency to the user terminal with an emphasis.

An exemplary recommendation algorithm-based problem action suggestion method may further include inquiring a related action manual in a manual DB of the database unit when the error code exists in the text data, where the providing the recommendation may include comparing at least one the action method included in the action manual and the action method extracted from the problem action history DB, displaying a recommendation result in an order of higher similarity through a graphical user interface (GUI) of the user terminal, and suggesting an action method of a highest similarity to the user terminal with an emphasis.

An exemplary recommendation algorithm-based problem action suggestion method may further include, after the providing the recommendation of action methods, storing a user action history received through a graphical user interface (GUI) of the user terminal into the problem action history DB, where a higher preferential point to be considered in future recommendation is given to the user action history that has successfully solved the problem.

According to an exemplary embodiment, an action period may be decreased by receiving query information of the user with respect to a problem occurrence situation of a product or production equipment and promptly suggesting an action method for a similar condition through the recommendation algorithm.

In addition, an optimal action method with respect to a situation of complicated hardware and software problems due to advancement of technology is suggested through an action manual and a big data analysis accumulate with the know-how of skilled workers, thereby supporting the decision-making of new workers and providing uniform improvement of quality.

BRIEF DESCRIPTION OF THE FIGURES

FIG. 2 schematically illustrates a problem action data table according to an exemplary embodiment.

FIG. 6 illustrates a GUI screen for recommending a problem action method when an error code exists according to an exemplary embodiment.

FIG. 8, FIG. 9, and FIG. 10 illustrate examples of a GUI screen according to an exemplary embodiment, assuming a scenario in which a problem occurs in production equipment.

FIG. 11, FIG. 12, and FIG. 13 illustrate examples of a GUI screen according to another exemplary embodiment, assuming a scenario in which an action method for the product failure is suggested by a service center.

DETAILED DESCRIPTION

Figure 1:
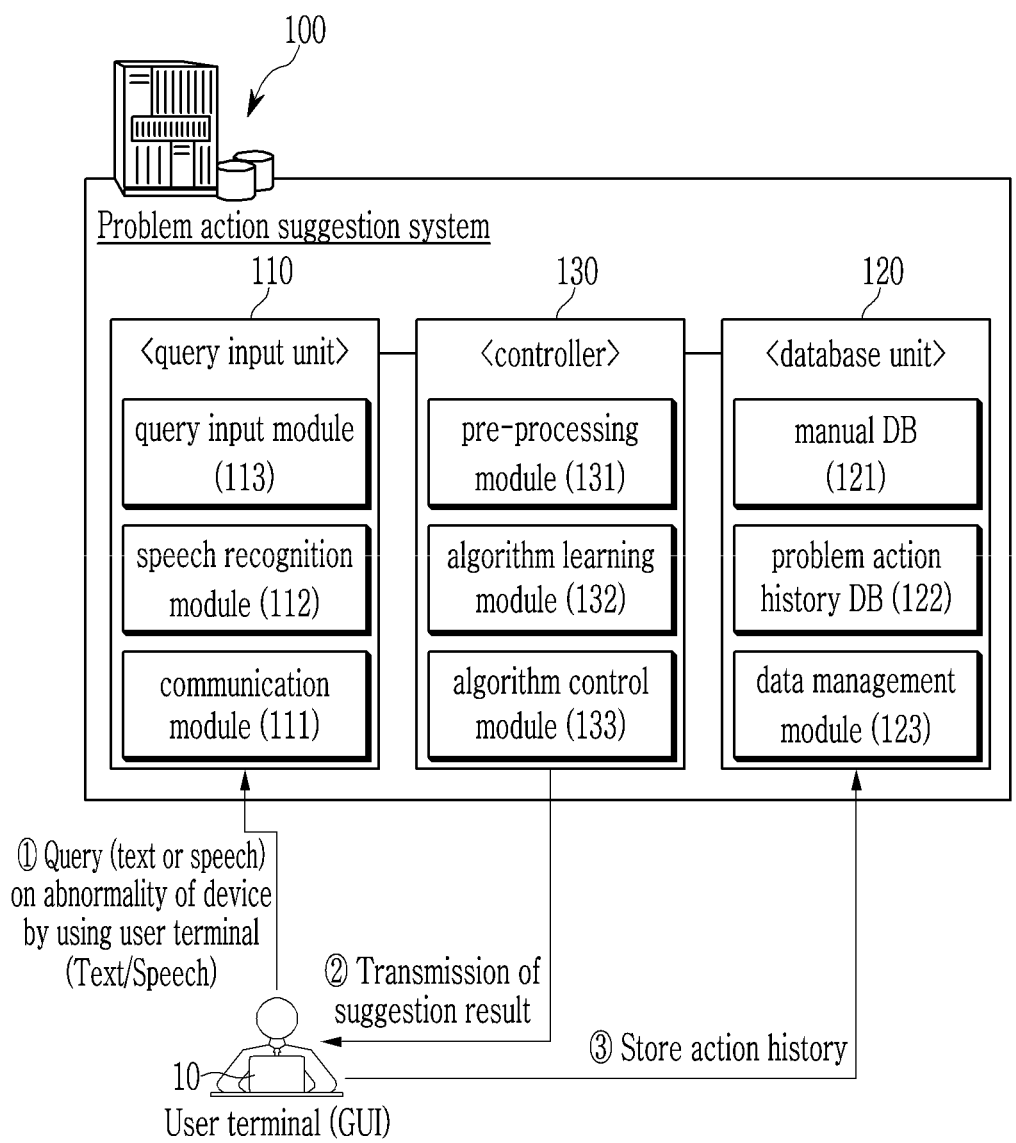
FIG. 1 is a block diagram that schematically illustrates a configuration of a recommendation algorithm-based problem action suggestion system according to an exemplary embodiment.

In the following detailed description, only certain exemplary embodiments of the present disclosure have been shown and described, simply by way of illustration.

The terminology used herein is for the purpose of describing particular embodiments only and is not intended to be limiting of the present disclosure. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any one or all combinations of one or more related items.

It is understood that the term "vehicle," "vehicular," "car," or other similar term as used herein is inclusive of motor vehicles, in general, such as passenger automobiles including sports utility vehicles (SUVs), buses, trucks, various commercial vehicles, watercraft including a variety of boats and ships, aircraft, and the like.

Throughout the specification, terms such as first, second, "A", "B", "(a)", "(b)", and the like will be used only to describe various elements, and are not to be interpreted as limiting these elements. These terms are only for distinguishing the constituent elements from other constituent elements, and nature or order of the constituent elements is not limited by the term.

In this specification, it is to be understood that when one component is referred to as being "connected" or "coupled" to another component, it may be connected or coupled directly to the other component or be connected or coupled to the other component with a further component intervening therebetween. In this specification, it is to be understood that when one component is referred to as being "connected or coupled directly" to another component, it may be connected to or coupled to the other component without another component intervening therebetween.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, a recommendation algorithm-based problem action suggestion system and a method thereof according to an exemplary embodiment is described in detail with reference to the drawings.

FIG. 1 is a block diagram that schematically illustrates a configuration of a recommendation algorithm-based problem action suggestion system according to an embodiment.

Referring to FIG. 1, a problem action suggestion system 100 according to an exemplary embodiment may be built in a server configured to manage a vehicle production factory or a vehicle product service center, and may include a query input unit 110, a database unit 120, and a controller 130.

The query input unit 110 is configured to extract text data for each item in user's query information received from a user terminal 10 as abnormality of a device such as a production equipment or a product, and to transmit the extracted text data to the controller 130.

Here, the user terminal 10 is an information communication terminal such as a computer, a laptop, a tablet PC, and a smart phone, and may include a client program for connection with the problem action suggestion system 100. The client program is configured to receive the user's query information on the problem situation of the device through a graphical user interface (GUI), and to request a search for an action suggestion to the problem action suggestion system 100. The user's query information includes device information, a degree of deterioration, a state measurement value, and query content with respect to the abnormality (refer to FIG. 3).

The user terminal 10 is configured to receive an action method suggested by the problem action suggestion system 100 in response to the request for the search for the action suggestion, and to display the suggested action method through the GUI.

The query input unit 110 includes a communication module 111, a speech recognition module 112, and a query input module 113.

The communication module 111 is connected to the user terminal 10 through wired/wireless communication, and configured to receive query information with respect to problem situation of the device in the form of at least one of text and speech through the GUI. The user may be a worker for maintenance of the production equipment, or a worker of a service center for repair and maintenance of the product worker, and hereinafter, the term worker may be used in this meaning.

The speech recognition module 112 is configured to convert the speech inputted as the query information into the text data through a speech recognition algorithm.

The query input module 113 extracts text data that is meaningful in identifying a problem situation of the device, such as letters, numbers, and symbols for each item of the user's query information, and inputs the extracted text data to the controller 130. At this time, the query input module 113 is configured to extract worker information (for example, worker ID) and the text data for each item from the query information received through the GUI, to collect the text data converted through the speech recognition module 112, and to input the collected data.

The database unit 120 is configured to store various programs and data for operating the problem action suggestion system 100 according to an exemplary embodiment, and to store data generated by the operation thereof.

The database unit 120 converts an action manual and a past action history of workers with respect to abnormality occurrence of the various devices into a database (DB) of problem action data, and thereby establishes big data.

For example, FIG. 2 schematically illustrates a problem action data table according to an embodiment.

Referring to FIG. 2, a problem action data table according to an exemplary embodiment includes various items such as the device information, usage environment, measurement information, abnormality information, and action content.

The device information includes model name, specification, production date, use start date, cumulative use days, software (S/W) version, and the like of corresponding equipment/product.

The usage environment may include production volume, cycle time, process, add-on function, and the like.

The measurement information may include measurement values, such as temperature, voltage, current, resistance, vibration, concentration, and the like, collected by sensors on occurrence of the problem.

The abnormality information may include abnormality query content, an error code, and the like inputted by the user.

The action content may include start time and end time, presumed cause, solution plan, detailed action, and the like of the user's problem action.

However, it may be understood that detailed items of the problem action data table may be varied depending on the field of the application of the present disclosure.

The database unit 120 includes a manual DB 121 based on the problem action data, a problem action history DB 122, and a data management module 123.

The manual DB 121 is configured to store action manual with respect to error codes for previously known various problem situations for each type and specification of the device.

The problem action history DB 122 is configured to store a problem action history of cases in which field workers of production factory and service center have taken actions for various problem situations occurring in the device of various equipment and products. The problem action history DB 122 may be generated based on previous action histories and know-hows of field workers with or without the action manual.

The data management module 123 is configured to manage the manual DB 121 and the problem action history DB 122 that are compared with the user's query information.

The data management module 123 is configured to collect results of actions taken by the workers with respect to various problems for each device depending on their experiences and know-hows, and to update the problem action history DB 122 with the received problem action history.

The data management module 123 may be configured to receive a feedback of an action history of the result after the field worker has performed the problem action method suggested by the problem action suggestion system 100 in response to the query information, and may update the problem action history DB 122. That is, the data management module 123 is configured to receive the problem action history from the user terminal 10, and to continuously update the problem action history DB 122 with the received problem action history In addition, when reliability of an action method is verified because an action success rate with respect to a certain problem situation managed in the problem action history DB 122 meets a predetermined standard, the data management module 123 is configured to assign a new error code to the certain problem situation, designate the verified action method as a corresponding action method for the certain problem situation, and manage the certain problem the new error code for the certain problem situation and the verified action method in the manual DB 121.

The controller 130 is a central processing unit adapted to control an overall operation of a recommendation algorithm-based problem action method according to an exemplary embodiment.

The controller 130 is configured to perform a pre-processing work for converting the text data inputted from the query input unit 110 into numerical data that may be processed by a recommendation algorithm, to obtain similarity between the numerical data and problem action data of the database unit 120, and to suggest action methods to the user terminal 10 in an order of higher probability of solving the problem.

In an embodiment, a series of processing processes performed by the controller 130 as described above is defined as a recommendation algorithm-based problem action method, with respect to the user's query information.

The controller 130 includes a pre-processing module 131, an algorithm learning module 132, and an algorithm control module 133.

The pre-processing module 131 is configured to perform a natural language processing on the text data to remove stopwords, and to convert the text data into numerical data that may be processed in the recommendation algorithm through a pre-processing process such as tokenizing and word embedding.

Figure 3:
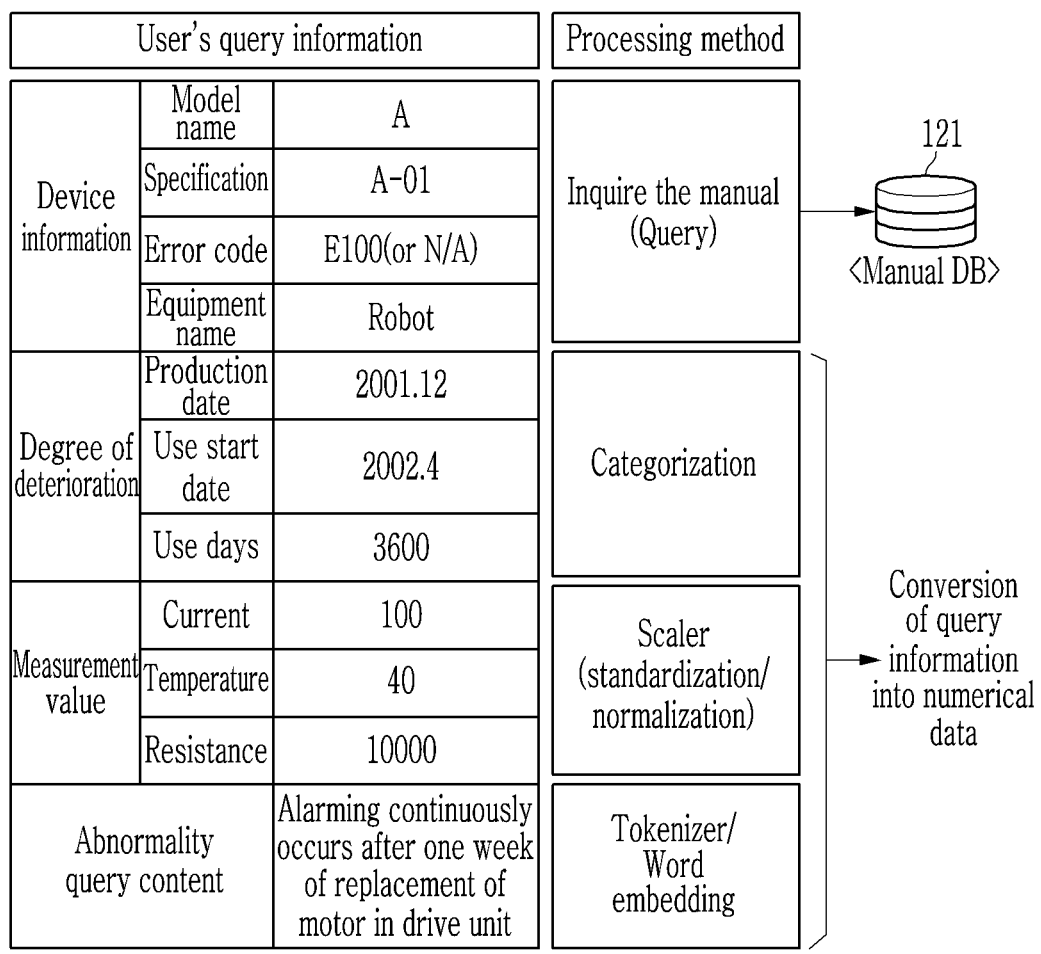
FIG. 3 and FIG. 4 illustrate a pre-processing method on user's query information according to an exemplary embodiment.
Figure 4:
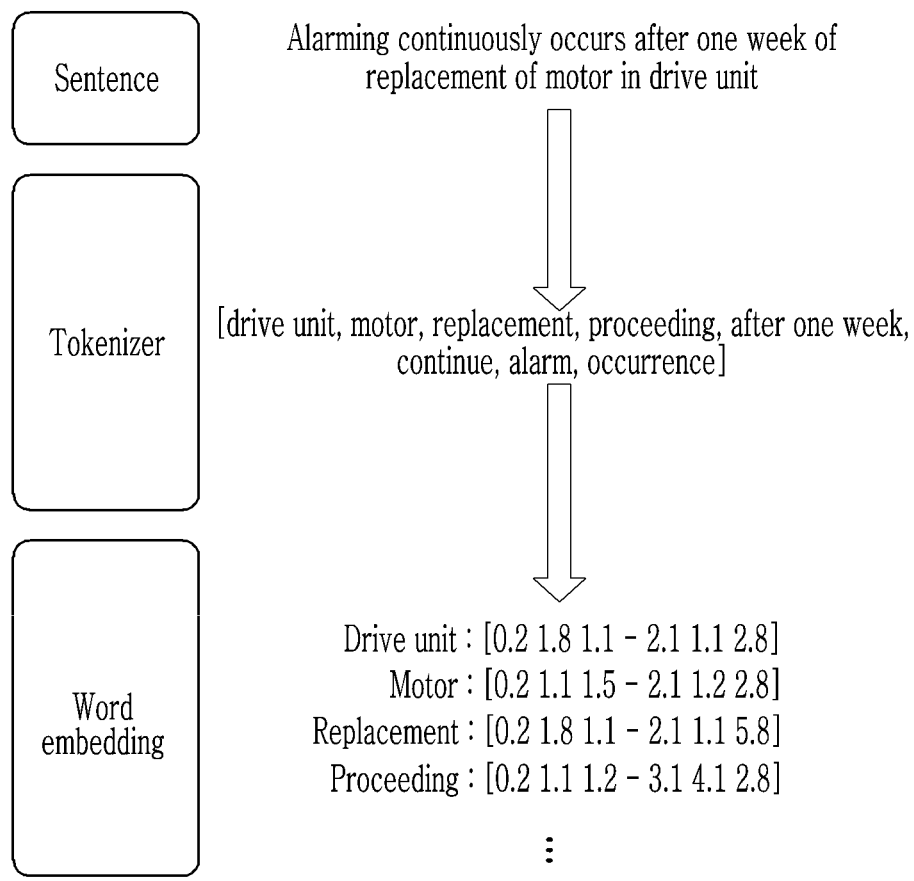

FIG. 3 and FIG. 4 illustrate a pre-processing method on the user's query information according to an embodiment.

Referring to FIG. 3 and FIG. 4, the pre-processing module 131 may preferentially check whether an error code exists in the text data inputted from the query input unit 110, and inquire a related action manual in the manual DB 121. The error code may mean a code value that predefines an error that may occur in the device, and may be obtained through self-diagnosis of the device and the like. Here, the existence of the error code suggests that the manual DB 121 manages an action manual whose reliability has been verified with respect to a predefined error. Conversely, the absence of the error code may mean an action situation to be determined according to the know-how or experience of the worker, as an abnormality situation that is not yet well known or rare has occurred. Therefore, it is better for the worker to make a query request to the corresponding action manual by preferentially entering an identifiable error code.

However, when there is no error code in the query information (N/A), or when various parts must be sequentially checked to solve one error code (one error case) even if an action manual for the error code is secured, there is an disadvantage of requiring many action procedures and a large time.

Accordingly, the pre-processing module 131 performs a pre-processing work to extract only similar data matching the problem situation from the problem action history DB 122, using the text data and numerical data of each item input in the query information in addition to the error code.

The pre-processing module 131 is configured to perform word embedding with respect to the text data and/or normalization (also called standardization) of numerical values (for example, the degree of deterioration, the measurement value, and the like) for respective items, and thereby convert the text data into numerical data appropriate for the recommendation algorithm processing. That is, since the numerical values for respective items of the degree of deterioration and the measurement values may show a substantial difference in scale, the numerical data is processed into normalized data through categorizing and scaler-processing.

For example, in the case of the degree of deterioration, categories for the production date the use period from the installation date to the present date for identifying characteristics of respective models of the device may be numerically classified. In addition, in the case of the measurement values, when the corresponding data such as a temperature of 40 degrees and a resistance of 10000 ohms is input as it is, a large value of the data may have a large influence in the algorithm, and distortion of the result may occur. To prevent this, the numerical value may be adjusted using a scaler. For example, when a normalization scaler (e.g., MinMaxScaler) is applied to the temperature value, an adjustment value may be calculated as "adjustment value=(measurement value−Min)/(Max−Min)", where the Min and Max values may be minimum/maximum operating temperatures of the equipment defined in the device specification.

The pre-processing module 131 is configured to convert the sentences contained in the user's abnormality query content in the text data into the numerical data through natural language processing and word embedding processing through a tokenizer.

Figure 5:
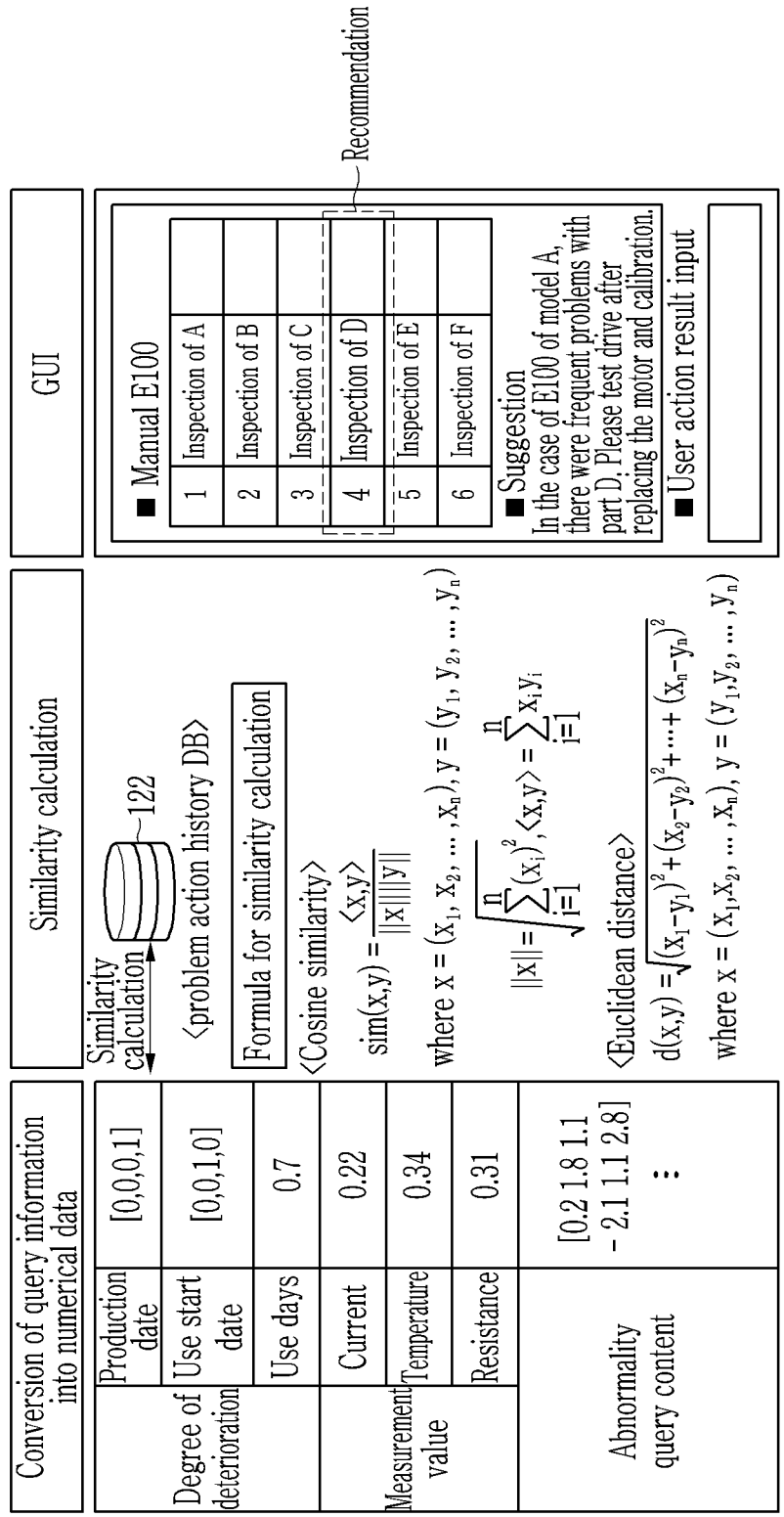
FIG. 5 illustrates a query content processing method according to an exemplary embodiment.

For example, FIG. 5 illustrates a query content processing method according to an embodiment.

Referring to FIG. 5, the pre-processing module 131 categorizes the text data in word units by natural language processing the query content in the form of a sentence through a tokenizer, and removes stopwords. In this case, the word may be composed of one or more words that may be written independently.

For example, when the sentence is "Alarming continuously occurs after one week of replacement of motor in drive unit", it may be classified into words of "drive unit, motor, replacement, proceeding, after one week, continue, alarm, occurrence".

Then, the pre-processing module 131 converts the classified words into numerical data usable in the recommendation algorithm by using a word embedding model learned in the algorithm learning module 132. The word embedding is a method of digitizing the classified words to express them as vectors, and a word embedding model is used in the digitization process.

The algorithm learning module 132 generates a normalization (standardization) model for predicting missing values and outliers in advance for pre-processing of user's query information.

The algorithm learning module 132 may generate a normalization model for categorizing and scaling numerical values for respective items in the text data.

The algorithm learning module 132 is configured to create and manage the word embedding model and a corresponding database in advance, for the pre-processing work on query content in the text data.

The algorithm control module 133 is configured to extract only data meeting a predetermined similarity condition from the problem action history DB 122 by using the pre-processed data, and to provide an action method of a highest similarity among the extracted data as recommendation through the GUI of the user terminal 10.

At this time, the algorithm control module 133 may be configured to calculate the similarity between two vectors of the pre-processed data for respective items of the query information and the data of the problem action history DB 122, and to recommend an action method of a highest similarity. For example, the similarity calculation method may use at least one of a Euclidean distance measurement method of measuring a linear distance between the two vectors, a cosine similarity measurement method of measuring similarity through an angle between the two vectors, and Manhattan distance measurement method that uses a sum of absolute values of Cartesian coordinate differences of the two vectors.

Meanwhile, FIG. 6 illustrates a GUI screen for recommending a problem action method when an error code exists according to an embodiment.

Referring to FIG. 6, when an error code exists in user's query information, the algorithm control module 133 first detects an action manual matching the error code from the manual DB 121.

In this case, the suggestion of action methods in the case that the error code exists may be provided in the following two exemplary embodiments depending on user's option selection.

In a first exemplary embodiment, the algorithm control module 133 may be configured to display a recommendation result in the order of higher occurrence frequency among at least one action method included in the action manual, and to suggest an action method of a highest occurrence frequency to the worker (i.e., the user terminal 10) with an emphasis.

In a second exemplary embodiment, the algorithm control module 133 may be configured to compare at least one action method included in the action manual and action method extracted from the problem action history DB 122, to display the recommendation result in an order of higher similarity, and to suggest an action method of a highest similarity to the worker (i.e., the user terminal 10) with an emphasis.

The GUI screen includes a user action result input menu for inputting a result of an actually performed action by the field worker among the suggested action methods.

The worker may perform the suggested action methods in the recommended order, and may make a feedback by inputting an optimal action result (for example, No. 4) that has solved the problem or another action result (for example, No. 3) into the user action result input menu of the GUI.

The algorithm control module 133 is configured to transmit the action result provided as a feedback through the GUI to the data management module 123 for an update of the DB, and thereby an occurrence frequency with respect to the corresponding action method may be increased.

As described above, the controller 130 is configured to support decision-making of workers to decrease the action period, thereby providing uniformly improve quality, by promptly suggesting an action method of similar cases through the recommendation algorithm upon receiving query information of a user with respect to a problem occurrence situation of a product or a production equipment.

The controller 130 may be implemented as at least one processor that operate respective modules in the system by a preset program, and the preset program may be programmed to perform respective steps of a recommendation algorithm-based problem action suggestion method according to an embodiment.

A recommendation algorithm-based problem action suggestion method is hereinafter described in further detail with reference to the drawings.

Figure 7:
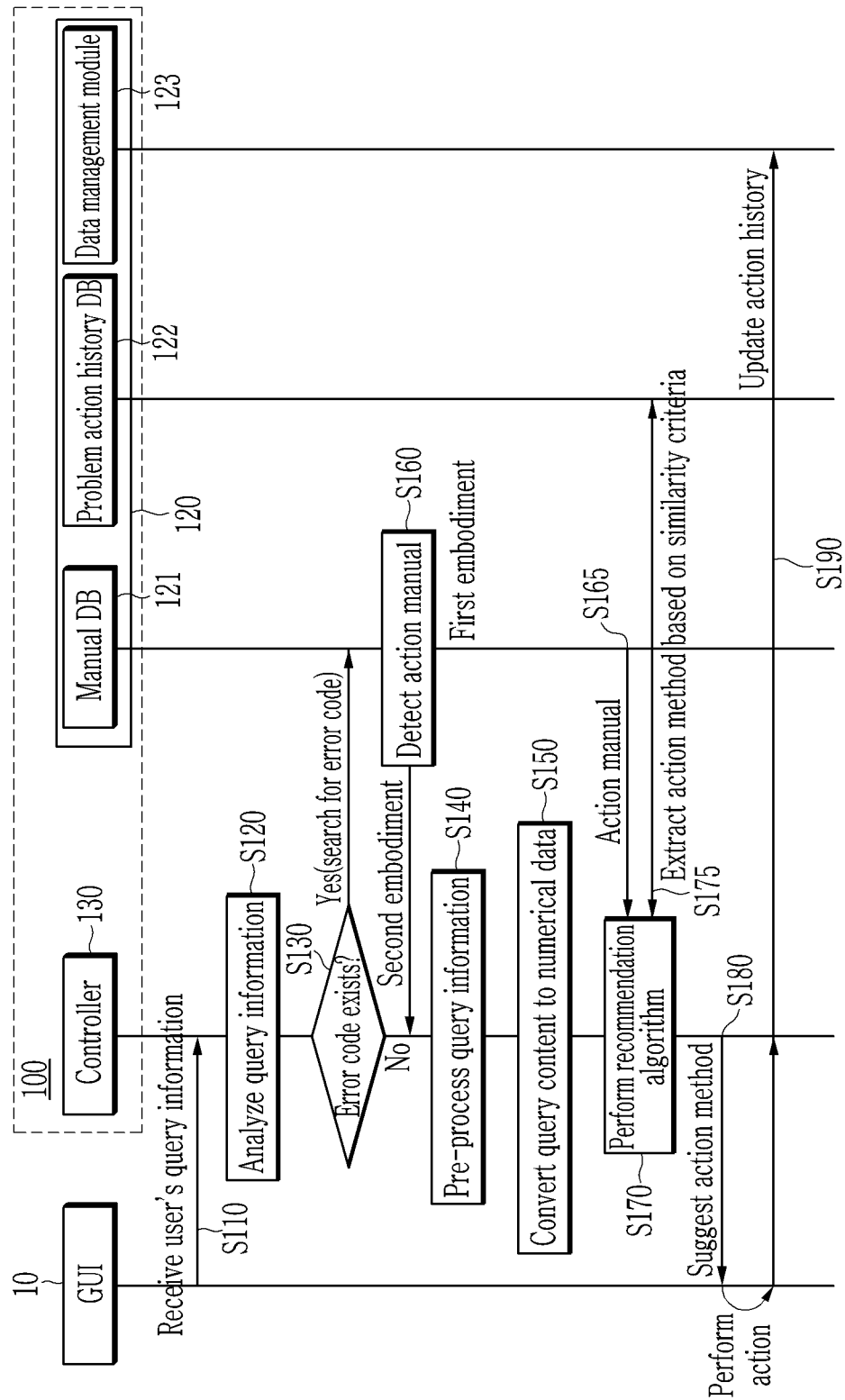
FIG. 7 is a flowchart showing a recommendation algorithm-based problem action method according to an exemplary embodiment.

FIG. 7 is a flowchart showing a recommendation algorithm-based problem action method according to an embodiment.

FIG. 8 to FIG. 10 illustrate examples of a GUI screen according to an embodiment, assuming a scenario in which a problem occurs in production equipment.

Referring to FIG. 7, when a failure event occurs in a specific device, an equipment maintenance worker of the production factory may input the user's query information with respect to abnormality of the device through the GUI of the user terminal 10 (refer to FIG. 8), and request an action suggestion search.

Upon receiving the user's query information from the user terminal 10 on the abnormality occurrence of the device at step S110, the controller 130 of the problem action suggestion system 100 analyzes the received query information to extract the text data for each item at step S120.

At step S130, the controller 130 determines whether an error code exists in the extracted text data.

Hereinafter, a recommendation algorithm-based problem action method according to an embodiment will be described separately according to the presence or absence of the error code.

When the error code does not exist in the extracted text data (S130; No), the controller 130 performs the pre-processing work for converting the text data into numerical data that may be processed by the recommendation algorithm according to an embodiment at step S140. At this time, the controller 130 processes the numerical values for respective items such as the degree of deterioration or the measurement value in the text data into the normalized numerical data through categorizing and scaler-processing.

Then, at step S150, the controller 130 converts the sentence contained in the user's abnormality query content in the text data into numerical data through natural language processing and word embedding processing through a tokenizer.

At step S170, the controller 130 obtains similarity between the numerical data and problem action data stored in the problem action history DB 122 by performing the recommendation algorithm, and provides a recommendation of action methods in an order of higher probability of solving the problem to the user (i.e., the user terminal 10).

At this time, at step S175, the controller 130 is configure to calculate similarity between the two vectors of the numerical data and data stored in the problem action history DB 122, and to extract only action methods meeting a predetermined similarity criteria condition.

At step S180, the controller 130 displays extracted action methods in an order of higher similarity, and provides a failure action method of a highest similarity among the extracted action methods through the GUI of the user terminal 10, as a suggestion of a recommendation method (refer to FIG. 9).

Thereafter, at step S190, the controller 130 transmits an action result fed back by the worker through the GUI of the user terminal 10 after performing the action to the data management module 123, for the update of the DB.

Meanwhile, when the error code exists in the extracted text data (S130-Yes), the controller 130 searches the manual DB 121 for the error code to detect a corresponding action manual at step S160.

At this time, while performing the recommendation algorithm under the condition that the error code exists the controller 130 may selectively perform, according to the user's option selection, a first embodiment using only the action manual DB 121 or a second embodiment using both of the action manual DB 121 and the problem action history DB 122.

For example, in the first embodiment, when the detected action manual is obtained at step S165, the controller 130 performs the recommendation algorithm to display the recommendation result in the order of higher occurrence frequency among at least one action method included in the action manual, at step S170. In addition, at the step S180, the controller 130 may suggest an action method of a highest occurrence frequency with an emphasis to the worker (refer to FIG. 10). And, it is possible to suggest to the operator by highlighting the action method with the highest frequency of occurrence (S180) (refer to FIG. 10).

In addition, in the second embodiment, the controller 130 also processes all the steps S140 to S150 of the first embodiment, i.e., detecting the recommendation result in the order of higher occurrence frequency from among at least one action method included in the action manual through the manual DB 121, and extracting an action method meeting similarity criteria through action history DB 122. In addition, in the case of the second embodiment, the controller 130 detects the recommendation results in the order of occurrence frequency among one or more action methods included in the action manual through the manual DB 121 according to the first embodiment process and the process of extracting the action method of the similarity standard condition through the action history DB 122 (S140 to S150). In addition, the controller 130 compares at least one action method included in the action manual and action method extracted from the problem action history DB 122, displays the recommendation result in an order of higher similarity, and suggests an action method of a highest similarity to the worker (i.e., the user terminal 10) with an emphasis.

Thereafter, at the step S190, the controller 130 transmits an action result fed back by the worker through the GUI of the user terminal 10 after performing the action to the data management module 123, for the update of the DB. That is, at the step S190, the controller 130 stores a user action history received through the GUI of the user terminal 10 into the problem action history DB 122. The user action history may include an action method that has been actually performed by the worker, whether the action method has successfully solved the problem, an actual action period taken by the worker, the worker's comments, and the like. At this time, the data management module 123 may give a higher preferential point to be considered in future recommendation to the user action history that has successfully solved the problem. Thereby, a worker's decision-making on the future occurrence of the same problem may be better supported, also providing a precise estimation of required time for solving the problem.

In the above, a recommendation algorithm-based problem action method according to an embodiment has been described on the assumption of a scenario in which a problem occurs in the production equipment. However, it may be understood that the present disclosure is not limited thereto and may be applied to the scenario in which an action method is suggested on the situation of the product failure in the service center.

For example, FIG. 11 to FIG. 13 respectively illustrate examples of the GUI screen according to another embodiment, assuming a scenario in which an action method for the product failure is suggested by a service center.

Referring to FIG. 11 to FIG. 13, when a failure occurs in a vehicle of a specific model and the vehicle with the failure is received at the service center, the worker searches for action suggestions by inputting the user's query information on the failure situation through the GUI. In addition, the problem action suggestion system 100 may provide a corresponding failure action suggestion that is derived depending on an existence of the error code in the query information.

Details of such search trial and action suggestion provided in response to the search may be referred to the recommendation algorithm-based problem action method that is described with reference to FIG. 7.

As such, according to an embodiment, an action period may be decreased by receiving query information of the user with respect to a problem occurrence situation of a product or production equipment and promptly suggesting an action method for a similar condition through the recommendation algorithm.

In addition, an optimal action method with respect to a situation of complicated hardware and software problems due to advancement of technology is suggested through an action manual and a big data analysis accumulate with the know-how of skilled workers, thereby supporting the decision-making of new workers and providing uniformly improved quality.

The embodiments of the present disclosure described above are not only implemented by the apparatus and the method, but may be implemented by a program for realizing functions corresponding to the configuration of the embodiments of the present disclosure or a recording medium on which the program is recorded.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. A recommendation algorithm-based problem action suggestion system, comprising:
    a query input unit configured to extract text data for each item in a user's query information received from a user terminal in an abnormality of a device of production equipment or a product;
    a database unit configured to manage a past action history of workers with respect to an abnormality occurrence of the device into a database (DB) of problem action data; and
    a controller configured to perform a pre-processing work for converting the text data into numerical data for processing by the recommendation algorithm, to obtain a similarity between the numerical data and the problem action data of the database unit, and to suggest action methods to the user terminal in an order of higher probability of solving a problem to lower probability of solving the problem, the controller comprising a processor coupled to a memory;
    wherein the database unit comprises:
        a manual DB configured to store an action manual with respect to error codes for previously known problems for each type and specification of the device;
        a problem action history DB configured to store a problem action history of cases in which workers of a production factory or service center have taken actions for various problem situations occurring in the device of various equipment or products; and
        a data management module configured to receive the problem action history from the user terminal, and to continuously update the problem action history DB with the received problem action history; and
    wherein the data management module is further configured to, when reliability of an action method is verified because an action success rate with respect to a certain problem situation managed in the problem action history DB meets a predetermined standard, assign a new error code to the certain problem situation and manage the error code for the certain problem situation and the verified action method in the manual DB.

2. The recommendation algorithm-based problem action suggestion system of claim 1, wherein the query input unit comprises:
    a communication module configured to receive the query information with respect to the problem of the device in the form of at least one of text or speech through a graphical user interface (GUI) of the user terminal;
    a speech recognition module configured to convert the speech into the text data through a speech recognition algorithm; and
    a query input module configured to extract user information and the text data for each item from the user's query information, to collect the text data converted through the speech recognition module, and input the collected data to the controller.

3. The recommendation algorithm-based problem action suggestion system of claim 1, wherein the problem action data comprises at least one of device information, usage environment, measurement information, abnormality information, and action content.

4. The recommendation algorithm-based problem action suggestion system of claim 1, wherein the user's query information comprises device information, a degree of deterioration, a state measurement value, and an abnormality query content.

5. The recommendation algorithm-based problem action suggestion system of claim 1, wherein the controller comprises:
    a pre-processing module configured to convert the text data into the numerical data that is processed in the recommendation algorithm by performing a natural language processing on the text data to remove a stopword and by performing a pre-processing of tokenizing and word embedding on the text data;
    an algorithm learning module configured to create and manage a word embedding model and a corresponding database in advance, for the pre-processing work on an abnormality query content of the user in the text data; and
    an algorithm control module configured to extract data meeting a predetermined similarity condition from a problem action history DB of the database unit by using the numerical data, and to provide an action method of a highest similarity among the extracted data as recommendation through a graphical user interface (GUI) of the user terminal.

6. The recommendation algorithm-based problem action suggestion system of claim 5, wherein the pre-processing module is configured to process numerical values for respective items of a degree of deterioration and a state measurement value inputted as the query information into normalized numerical data through categorizing and scaler-processing.

7. The recommendation algorithm-based problem action suggestion system of claim 5, wherein the algorithm control module is configured to calculate a similarity between two vectors of the numerical data and problem action history DB data and to recommend action methods in an order of higher similarity to lower similarity.

8. The recommendation algorithm-based problem action suggestion system of claim 7, wherein the algorithm control module is configured to calculate the similarity by using at least one of a Euclidean distance measurement method of measuring a linear distance between the two vectors, a cosine similarity measurement method of measuring similarity through an angle between the two vectors, and Manhattan distance measurement method that uses a sum of absolute values of Cartesian coordinate differences of the two vectors.

9. The recommendation algorithm-based problem action suggestion system of claim 5, wherein the pre-processing module is configured to check whether an error code exists in the text data, and to inquire a related action manual in a manual DB of the database unit.

10. The recommendation algorithm-based problem action suggestion system of claim 9, wherein the algorithm control module is configured to display a recommendation result in an order of higher occurrence frequency among at least one the action method included in the action manual, and to suggest an action method of a highest occurrence frequency to the user terminal with an emphasis.

11. The recommendation algorithm-based problem action suggestion system of claim 9, wherein the algorithm control module is configured to compare at least one the action method included in the action manual and the action method extracted from the problem action history DB, to display a recommendation result in an order of higher similarity, and to suggest an action method of a highest similarity to the user terminal with an emphasis.

12. A recommendation algorithm-based problem action suggestion method, comprising:
   extracting, by a query input unit, text data for each item in user's query information received from a user terminal in an abnormality of a device of production equipment or a product;
   determining whether an error code exists in the text data;
   when the error code does not exist, performing, by a controller, a pre-processing work for converting the text data into numerical data to be processed by the recommendation algorithm;
   providing a recommendation of action methods in an order of higher probability of solving a problem to lower probability of solving the problem to the user terminal, by obtaining similarity between the numerical data and problem action data stored in a problem action history DB by performing the recommendation algorithm;
   receiving problem action history from the user terminal;
   continuously updating the problem action history DB with the received problem action history; and
   when reliability of an action method is verified because an action success rate with respect to a certain problem situation managed in the problem action history DB meets a predetermined standard, assigning a new error code to the certain problem situation and managing the error code for the certain problem situation and the verified action method in a manual DB.

13. The recommendation algorithm-based problem action suggestion method of claim 12, wherein the performing the pre-processing work comprises:

processing numerical values for items in the text data into normalized numerical data through categorizing and scaler-processing; and
converting a sentence contained in the user's abnormality query content in the text data into the numerical data through natural language processing and word embedding processing through a tokenizer.

14. The recommendation algorithm-based problem action suggestion method of claim 12, wherein providing the recommendation comprises:
   calculating a similarity between two vectors of the numerical data and data stored in the problem action history DB;
   extracting action methods meeting a predetermined similarity criteria condition; and
   providing a suggestion of a failure action method of a highest similarity among the extracted action methods through the user terminal.

15. The recommendation algorithm-based problem action suggestion method of claim 12, further comprising, after the determining whether an error code exists in the text data:
   inquiring a related action manual in a manual DB of the database unit depending on a user's option selection, when the error code exists in the text data; and
   displaying a recommendation result in an order of higher occurrence frequency to lower occurrence frequency among at least one the action method included in the action manual through a graphical user interface (GUI) of the user terminal, and suggesting an action method of a highest occurrence frequency to the user terminal with an emphasis.

16. The recommendation algorithm-based problem action suggestion method of claim 12, further comprising inquiring a related action manual in a manual DB of the database unit when the error code exists in the text data,
   wherein providing the recommendation comprises:
   comparing at least one the action method included in the action manual and the action method extracted from the problem action history DB;
   displaying a recommendation result in an order of higher similarity through a graphical user interface (GUI) of the user terminal; and
   suggesting an action method of a highest similarity to the user terminal with an emphasis.

17. The recommendation algorithm-based problem action suggestion method of claim 12, further comprising, after the providing the recommendation of action methods:
   storing a user action history received through a graphical user interface (GUI) of the user terminal into the problem action history DB,
   wherein a higher preferential point to be considered in future recommendation is given to the user action history that has successfully solved the problem.

\* \* \* \* \*